US012700433B2

(12) United States Patent
Zong

(10) Patent No.: US 12,700,433 B2
(45) Date of Patent: Aug. 4, 2026

(54) COORDINATED CONTROL METHOD AND SYSTEM FOR HARD DISK HEAT DISSIPATION, DEVICE, MEDIUM, AND STORAGE SERVER

(71) Applicant: Suzhou MetaBrain Intelligent Technology Co., Ltd., Suzhou (CN)

(72) Inventor: Bin Zong, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/133,890

(22) PCT Filed: May 26, 2023

(86) PCT No.: PCT/CN2023/096619
§ 371 (c)(1),
(2) Date: May 29, 2025

(87) PCT Pub. No.: WO2024/113725
PCT Pub. Date: Jun. 6, 2024

(65) Prior Publication Data
US 2026/0011349 A1    Jan. 8, 2026

(30) Foreign Application Priority Data

Nov. 29, 2022    (CN) ......................... 202211507935.X

(51) Int. Cl.
*G11B 33/14*        (2006.01)
*G06F 1/20*         (2006.01)
(Continued)

(52) U.S. Cl.
CPC .............. *G11B 33/144* (2013.01); *G06F 1/20* (2013.01); *G06F 1/3234* (2013.01);
(Continued)

(58) Field of Classification Search
None
See application file for complete search history.

(56) References Cited

U.S. PATENT DOCUMENTS

2012/0215359 A1    8/2012    Michael et al.
2015/0192139 A1    7/2015    Yamaguchi et al.
(Continued)

FOREIGN PATENT DOCUMENTS

CN        103161747 A        6/2013
CN        103631351 A        3/2014
(Continued)

OTHER PUBLICATIONS

International Search Report of corresponding PCT application (PCT/CN2023/096619) Sep. 8, 2023, 7 pages.
(Continued)

*Primary Examiner* — Craig A. Renner
(74) *Attorney, Agent, or Firm* — Cooper Legal Group, LLC

(57) ABSTRACT

The present application relates to a coordinated control method and system for hard disk heat dissipation. The method includes: grouping hard disks according to a distance from the hard disks to an air source, and allocating read or write resources to the grouped hard disks, to enable the hard disks to perform read or write operations according to respective allocated read or write resources; acquiring a real-time power consumption value and a power consumption reference value of the hard disks performing the read or write operations, and determining a numerical relationship between the real-time power consumption value and the power consumption reference value of the hard disks; determining a corresponding interval polling strategy according to the numerical relationship to acquire a temperature value of a target hard disk; and performing coordinated control on hard disk heat dissipation according to the temperature value of the target hard disk.

20 Claims, 4 Drawing Sheets

Group hard disks according to a distance from the hard disks to an air source, and allocate read or write resources to the grouped hard disks, to enable the hard disks to perform read or write operations according to respective allocated read or write resources — S101

Acquire a real-time power consumption value and a power consumption reference value of the hard disks performing the read or write operations, and determine a numerical relationship between the real-time power consumption value and the power consumption reference value of the hard disks — S102

Determine a corresponding interval polling strategy according to the numerical relationship to acquire a temperature value of a target hard disk — S103

Perform coordinated control on the hard disk heat dissipation according to the temperature value of the target hard disk — S104

(51) Int. Cl.
    *G06F 1/3234*     (2019.01)
    *G11B 19/04*     (2006.01)

(52) U.S. Cl.
    CPC .......... *G06F 1/3268* (2013.01); *G11B 19/046*
               (2013.01); *G11B 33/142* (2013.01)

(56)            References Cited

U.S. PATENT DOCUMENTS

| | | |
|---|---|---|
| 2015/0241886 A1 | 8/2015 | Chang et al. |
| 2016/0062676 A1 | 3/2016 | Campbell et al. |
| 2020/0210304 A1* | 7/2020 | Wang et al. .......... G06F 1/3237 |

FOREIGN PATENT DOCUMENTS

| | | |
|---|---|---|
| CN | 108255272 A | 7/2018 |
| CN | 111610360 A | 9/2020 |
| CN | 111734668 A | 10/2020 |
| CN | 114510383 A | 5/2022 |
| CN | 114893430 A | 8/2022 |
| CN | 116088652 A | 5/2023 |

OTHER PUBLICATIONS

Written Opinion of International Searching Authority of correspond-ing PCT application (PCT/CN2023/096619) Sep. 8, 2023, 7 pages.
First Office Action cited in CN202211507935.X, mailed Dec. 12, 2025, 18 pages.

\* cited by examiner

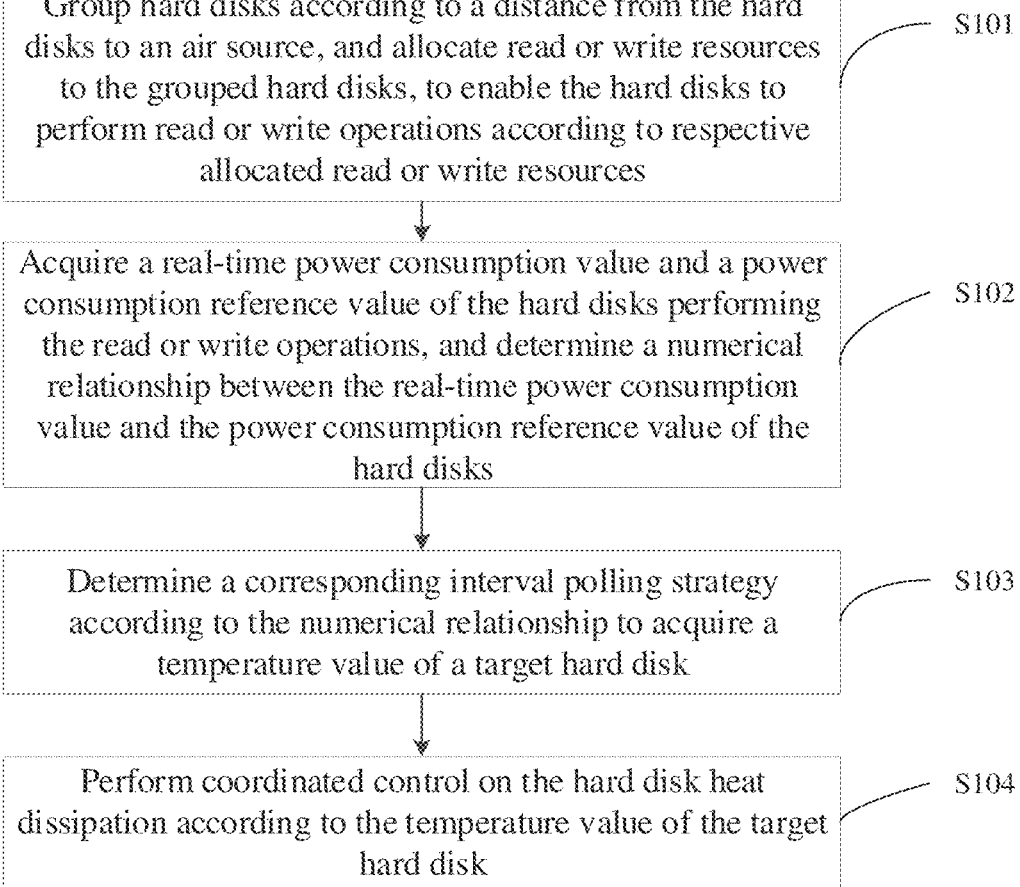

Group hard disks according to a distance from the hard disks to an air source, and allocate read or write resources to the grouped hard disks, to enable the hard disks to perform read or write operations according to respective allocated read or write resources — S101

Acquire a real-time power consumption value and a power consumption reference value of the hard disks performing the read or write operations, and determine a numerical relationship between the real-time power consumption value and the power consumption reference value of the hard disks — S102

Determine a corresponding interval polling strategy according to the numerical relationship to acquire a temperature value of a target hard disk — S103

Perform coordinated control on the hard disk heat dissipation according to the temperature value of the target hard disk — S104

FIG. 1

COORDINATED CONTROL METHOD AND SYSTEM FOR HARD DISK HEAT DISSIPATION, DEVICE, MEDIUM, AND STORAGE SERVER

CROSS-REFERENCE TO RELATED APPLICATION

This application is the national phase application of International Application No. PCT/CN2023/096619, filed May 26 2023, which claims priority to Chinese Patent Application No. 202211507935.X, filed on Nov. 29, 2022 in China National Intellectual Property Administration and entitled "Coordinated Control Method and System for Hard Disk Heat Dissipation, Device, Medium, and Storage Server". The contents of International Application No. PCT/CN2023/096619 and Chinese Patent Application 202211507935.X are incorporated herein by reference in their entireties.

FIELD

The present application relates to the field of storage heat dissipation, and in particular, to a coordinated control method and system for hard disk heat dissipation, a device, a medium, and a storage server.

BACKGROUND

With rapid development of technology, big data now has penetrated into every industry and business function. The explosive growth of information requires increasingly higher data storage capacity from servers, leading to a growing number of hard drives mounted in the storage servers. To improve the data storage capacity, the servers typically utilize storage cards and hard disk backplanes to accommodate more hard disks.

As the number of hard drives in the servers continues to increase, overall power consumption of the whole computer rises accordingly. To effectively cool the hard disks in the servers, a board management controller (BMC) is generally configured to acquire temperature information of the hard disks, and then adjust a rotation speed of a fan based on the temperature information acquired by the BMC to achieve temperature regulation. Inventors have recognized that a temperature regulation solution in the prior art has the following drawbacks: with a large number of hard disks, the BMC takes a relatively long time to poll all hard disks, making it difficult to provide timely feedback on the temperature of the hard disks; and after a full polling cycle for the hard disks, when the rotation speed of the fan is regulated based on the temperature information fed back by the BMC, the response of the fan is limited by its inherent physical characteristics, resulting in latency when increasing or decreasing the rotation speed.

Therefore, the above problems lead to extremely low efficiency in hard disk heat dissipation regulation at present.

SUMMARY

The present application provides a coordinated control method and system for hard disk heat dissipation, a device, a medium, and a storage server.

In one aspect, provided is a coordinated control method for hard disk heat dissipation. The coordinated control method for hard disk heat dissipation includes:

grouping hard disks according to a distance from the hard disks to an air source, and allocating read or write resources to the grouped hard disks, to enable the hard disks to perform read or write operations according to respective allocated read or write resources;

acquiring a real-time power consumption value and a power consumption reference value of the hard disks performing the read or write operations, and determining a numerical relationship between the real-time power consumption value and the power consumption reference value of the hard disks;

determining a corresponding interval polling strategy according to the numerical relationship to acquire a temperature value of a target hard disk; and performing coordinated control on the hard disk heat dissipation according to the temperature value of the target hard disk.

In one or more embodiments, the grouping hard disks according to a distance from the hard disks to an air source, and allocating read or write resources to the grouped hard disks includes:

dividing the hard disks into a plurality of hard disk modules according to the distance from the hard disks to the air source; and acquiring a resource allocation gradient table, and allocating the read or write resources to the plurality of hard disk modules according to the resource allocation gradient table.

In one or more embodiments, the dividing the hard disks into a plurality of hard disk modules according to the distance from the hard disks to the air source includes:

dividing the hard disks into modules along a direction of an airflow generated by the air source; and dividing a plurality of rows of hard disks perpendicular to the direction of the airflow into a plurality of hard disk modules, where one row of hard disks perpendicular to the direction of the airflow is one hard disk module.

In one or more embodiments, the resource allocation gradient table stores a relationship between each hard disk module and an amount of the corresponding read or write resource, where the hard disk module close to the air source is allocated with a high percentage of read or write resources and the hard disk module far from the air source is allocated with a small percentage of read or write resources.

In one or more embodiments, a real-time power consumption value of hard disks is an overall power consumption value of all hard disks, and the acquiring a real-time power consumption value and a power consumption reference value of the hard disks performing the read or write operations, and determining a numerical relationship between the real-time power consumption value and the power consumption reference value of the hard disks includes:

acquiring the overall power consumption value and an overall power consumption reference value of all hard disks performing the read or write operations; and determining a numeral relationship between the overall power consumption value and the overall power consumption reference value of all hard disks.

In one or more embodiments, the determining a corresponding interval polling strategy according to the numerical relationship to acquire a temperature value of a target hard disk includes:

when the overall power consumption value of all hard disks is less than a threshold of the overall power consumption reference value, acquiring the temperature value of the target hard disk according to a first interval polling strategy;

when the overall power consumption value of all hard disks is equal to or greater than the threshold of the overall power consumption reference value, acquiring the temperature value of the target hard disk according to a second interval polling strategy, where a polling interval in the second interval polling strategy is smaller than the polling interval in the first interval polling strategy; and the polling interval is a quantity of hard disks between two hard disks polled sequentially.

In one or more embodiments, the real-time power consumption value of the hard disks is a module power consumption value of the hard disk module, and the acquiring a real-time power consumption value and a power consumption reference value of the hard disks performing the read or write operations, and determining a numerical relationship between the real-time power consumption value and the power consumption reference value of the hard disks includes:

acquiring the module power consumption value and the module power consumption reference value of the hard disk module performing the read or write operation; and determining a numeral relationship between the module power consumption value and the module power consumption reference value of the hard disk module.

In one or more embodiments, the determining a corresponding interval polling strategy according to the numerical relationship to acquire a temperature value of a target hard disk includes:

when the module power consumption value of the hard disk module is less than a threshold of the module power consumption reference value, acquiring the temperature value of the target hard disk according to a third interval polling strategy; and when the module power consumption value of the hard disk module is equal to or greater than the threshold of the module power consumption reference value, acquiring the temperature value of the target hard disk according to a fourth interval polling strategy, where the polling interval in the fourth interval polling strategy is smaller than the polling interval in the third interval polling strategy.

In one or more embodiments, the numerical relationship between the real-time power consumption value and the power consumption reference value of the hard disks is a power consumption variation rate, and the acquiring a real-time power consumption value and a power consumption reference value of the hard disks performing the read or write operations, and determining a numerical relationship between the real-time power consumption value and the power consumption reference value of the hard disks includes:

acquiring an overall power consumption variation rate and an overall power consumption variation rate reference value of all hard disks performing the read or write operations; and determining a numeral relationship between the overall power consumption variation rate and the overall power consumption variation rate reference value of all hard disks.

In one or more embodiments, the determining a corresponding interval polling strategy according to the numerical relationship to acquire a temperature value of a target hard disk includes:

when an overall power consumption variation rate of all hard disks is less than a threshold of an overall power consumption variation rate reference value, acquiring the temperature value of the target hard disk according to a fifth interval polling strategy; and when the overall power consumption variation rate of all hard disks is equal to or greater than the threshold of the overall power consumption variation rate reference value, acquiring the temperature value of the target hard disk according to a sixth interval polling strategy, where the polling interval in the sixth interval polling strategy is smaller than the polling interval in the fifth interval polling strategy.

In one or more embodiments, a numerical relationship between a real-time power consumption value and a power consumption reference value of the hard disks is a power consumption variation rate, and the acquiring a real-time power consumption value and a power consumption reference value of the hard disks performing the read or write operations, and determining a numerical relationship between the real-time power consumption value and the power consumption reference value of the hard disks includes:

acquiring a module power consumption variation rate and a module power consumption variation rate reference value of the hard disk module performing the read or write operation; and determining a numeral relationship between the module power consumption variation rate and the module power consumption variation rate reference value of the hard disk module.

In one or more embodiments, the determining a corresponding interval polling strategy according to the numerical relationship to acquire a temperature value of a target hard disk includes:

when the module power consumption variation rate of the hard disk module is less than a threshold of the module power consumption variation rate reference value, acquiring the temperature value of the target hard disk according to a seventh interval polling strategy; and when the module power consumption variation rate of the hard disk module is equal to or greater than the threshold of the module power consumption variation rate reference value, acquiring the temperature value of the target hard disk according to an eighth interval polling strategy, where the polling interval in the eighth interval polling strategy is smaller than the polling interval in the seventh interval polling strategy.

In one or more embodiments, when the overall power consumption variation rate of all hard disks is less than the threshold of the overall power consumption variation rate reference value, and/or, when the module power consumption variation rate of the hard disk module is less than the threshold of the module power consumption variation rate reference value, the polling intervals in both the fifth interval polling strategy and the seventh interval polling strategy are 2.

In one or more embodiments, when the overall power consumption variation rate of all hard disks is equal to or greater than the threshold of the overall power consumption variation rate reference value, and the module power consumption variation rate of the hard disk module is equal to or greater than the threshold of the module power consumption variation rate reference value, the polling intervals in both the sixth interval polling strategy and the eighth interval polling strategy are 1.

In one or more embodiments, the performing coordinated control on the hard disk heat dissipation according to the temperature value of the target hard disk includes:

determining an average temperature value of the hard disk module including the target hard disk according to the temperature value of the target hard disk; and when a difference between the average temperature values of different hard disk modules is greater than a preset reference value, dynamically adjusting the resource allocation gradient table according to the difference between the average temperature values of different hard disk modules.

In one or more embodiments, the overall power consumption value and the module power consumption value are average values.

In one or more embodiments, the performing coordinated control on the hard disk heat dissipation according to the temperature value of the target hard disk further includes:

when any target hard disk is in an abnormal temperature state, reporting the abnormal temperature state of the target hard disk, and triggering an alarm.

In one or more embodiments, the performing coordinated control on the hard disk heat dissipation according to the temperature value of the target hard disk further includes:

when an average temperature value of the target hard disk is greater than a reference average value, increasing an airflow velocity of the air source.

In another aspect, provided is a coordinated control system for hard disk heat dissipation. The coordinated control system for hard disk heat dissipation includes:

a hard disk division module, configured to group hard disks according to a distance from the hard disks to an air source, and allocate read or write resources to the grouped hard disks, to enable the hard disks to perform read or write operations according to respective allocated read or write resources;

a parameter acquisition module, configured to acquire a real-time power consumption value and a power consumption reference value of the hard disks performing the read or write operations, and determine a numerical relationship between the real-time power consumption value and the power consumption reference value of the hard disks;

a temperature acquisition module, configured to determine a corresponding interval polling strategy according to the numerical relationship to acquire a temperature value of a target hard disk; and a coordinated control module, configured to perform coordinated control on hard disk heat dissipation according to the temperature value of the target hard disk.

In yet another aspect, provided is a computer device, which includes a memory and one or more processors, where the memory has computer-readable instructions stored therein, and the computer-readable instructions, when executed by the one or more processors, cause the one or more processors to perform the steps of the aforementioned coordinated control method for the hard disk heat dissipation.

In yet another aspect, provided is one or more non-transitory computer-readable storage media having computer-readable instructions stored therein, where the computer-readable instructions, when executed by one or more processors, cause the one or more processors to perform the steps of the aforementioned coordinated control method for the hard disk heat dissipation.

In still another aspect, provided is a storage server, including a coordinated control system for hard disk heat dissipation.

Details of one or more embodiments of the present application are described in the accompanying drawings and the descriptions below. Other features and advantages of the present application become clear with reference to the specification, the accompanying drawings, and the claims.

BRIEF DESCRIPTION OF THE DRAWINGS

To describe the technical solutions of the embodiments of the present application more clearly, the accompanying drawings required for describing the embodiments are introduced briefly below. Apparently, the accompanying drawings in the following description show only some embodiments of the present application, and a person of ordinary skill in the art may still derive other accompanying drawings from these accompanying drawings without creative efforts.

FIG. 1 is a first flowchart of a coordinated control method for hard disk heat dissipation according to one or more embodiments of the present application;

DETAILED DESCRIPTION

Figure 2:
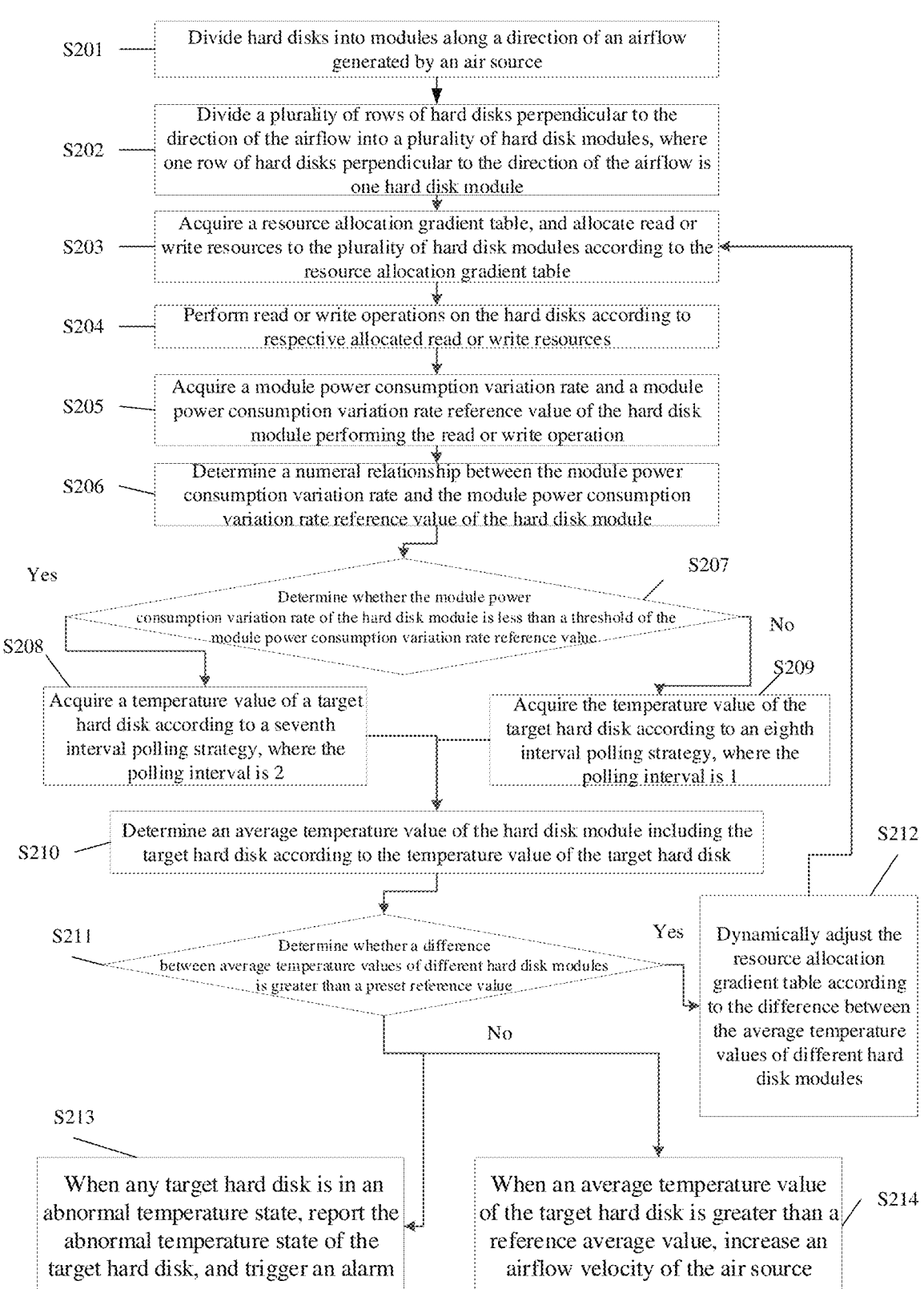
FIG. 2 is a second flowchart of a coordinated control method for hard disk heat dissipation according to one or more embodiments of the present application.

To make the objectives, technical solutions, and advantages of the present application clearer, the following further describes the present application in detail with reference to the accompanying drawings and the embodiments. It is to be understood that the specific embodiments described herein are only used to explain the present application, and not to limit the present application.

In some embodiments, referring to FIG. 1, FIG. 1 is a first flowchart of a coordinated control method for hard disk heat dissipation provided by an embodiment of the present application.

The coordinated control method for the hard disk heat dissipation includes the following steps:

S101: grouping hard disks according to a distance from the hard disks to an air source, and allocating read or write resources to the grouped hard disks, to enable the hard disks to perform read or write operations according to respective allocated read or write resources.

In some embodiments, in the coordinated control method for the hard disk heat dissipation provided by the present application, the coordinated control is performed on the heat dissipation of the hard disks in at least two dimensions. One dimension refers to the dimension of the hard disks, i.e., controlling the read or write resources allocated to different hard disks. In the prior art, the temperature of the hard disks that are close to the air source (an apparatus providing a heat dissipation airflow such as a fan assembly) is relatively low, and the temperature of the hard disks that are far away from the air source is relatively high. Accordingly, more read or write resources are allocated to the hard disks that are close to the air source, thereby balancing the power consumption of the hard disks, and further balancing the temperature of the hard disks. The other dimension refers to configuring different interval polling strategies to reduce time for polling the temperature of all hard disks. In this way, the controlling the read or write resources allocated to different hard disks in the first dimension includes firstly grouping the hard disks according to the distance from the hard disks to the air source, and then allocating the read or write resources to the grouped hard disks, to enable the hard disks to perform the read or write operations according to respective allocated read or write resources, thereby achieving an effect of balancing the temperature.

S102: acquiring a real-time power consumption value and a power consumption reference value of the hard disks performing the read or write operations, and determining a numerical relationship between the real-time power consumption value and the power consumption reference value of the hard disks.

In some embodiments, after the read or write resources are allocated, each hard disk performs the read or write operation according to the respective allocated read or write resource, then the real-time power consumption value and the power consumption reference value of the hard disks performing the read or write operations are acquired, and the numerical relationship between the real-time power consumption value and the power consumption reference value of the hard disks is determined, whereby different interval polling strategies are selected according to the numerical relationship between the real-time power consumption value and the power consumption reference value of the hard disks. The power consumption reference value is a user-defined value determined based on actual experimental data and/or an empirical value, and serves as a power consumption standard. The numerical relationship between the actual power consumption value and the power consumption reference value demonstrates whether the real-time power consumption of the hard disks is within the power consumption standard.

S103: determining a corresponding interval polling strategy according to the numerical relationship to acquire a temperature value of a target hard disk.

In some embodiments, after the numerical relationship between the real-time power consumption value and the power consumption reference value of the hard disk is determined, an interval polling strategy may be selected according to the numerical relationship between the two to allow the temperature value of the target hard disk to be acquired via interval polling of the hard disks instead of polling all hard disks, whereby the overall temperature of the hard disks might be reflected, and the efficiency for acquiring the temperature state of the hard disks might be improved effectively. By means of the interval polling strategy, all hard disks may be completely polled after several cycles, thereby reducing both the time consumption of a single polling cycle and the control response time. Based on the interval polling strategy, temperature readings of the adjacent hard disks are similar, which might reflect the overall temperature of all hard disks.

S104: performing coordinated control on the hard disk heat dissipation according to the temperature value of the target hard disk.

In some embodiments, after the temperature value of the target hard disk is acquired, the heat dissipation may be controlled according to the acquired temperature value of the target hard disk. For example, if the temperature state of the target hard disk is abnormal, the abnormal information of the target hard disk may be reported and an alarm is triggered to remind the maintenance personnel to do maintenance; or whether the heat dissipation requirement of the hard disk is met is determined according to the temperature value of the target hard disk, and if the heat dissipation requirement of the hard disk fails to be met, the flow velocity of the heat dissipation airflow generated by the air source may be adjusted to improve the heat dissipation capacity, thereby meeting the heat dissipation requirement of the hard disk.

In some embodiments, the step of grouping hard disks according to a distance from the hard disks to an air source, and allocating read or write resources to the grouped hard disks includes:

dividing the hard disks into a plurality of hard disk modules according to the distance from the hard disks to the air source.

In some embodiments, the hard disks are divided into a plurality of hard disk modules according to the distance from the hard disks to the air source, and the read or write resources allocated to different hard disk modules are different in amount, thereby balancing the temperature of the hard disks.

A resource allocation gradient table is acquired, and the read or write resources are allocated to the plurality of hard disk modules according to the resource allocation gradient table.

In some embodiments, in the prior art, the temperature of the hard disks that are close to the air source is relatively low, and the temperature of the hard disks that are far away from the air source is relatively high. However, the percentage of a temperature increase from an end close to the air source to an end far away from the air source may be acquired based on the data, and the percentage of the read or write resources allocated may be determined based on the percentage of the temperature increase. From the end close to the air source to the end far away from the air source, the temperature of the hard disks increases but the percentage of the read or write resources allocated to the hard disks reduces, whereby loads of the hard disks are balanced, and the temperature of the hard disks is further balanced.

In some embodiments, the step of dividing the hard disks into a plurality of hard disk modules according to the distance from the hard disks to the air source includes: dividing the hard disks in to modules along the direction of the airflow generated by the air source.

In some embodiments, the temperature of the hard disks that are close to the air source is relatively low, and the temperature of the hard disks that are far away from the air source is relatively high, and accordingly, the temperature of the hard disks changes along the direction of the airflow generated by the air source, and the hard disks are divided into modules along the direction of the airflow generated by the air source.

A plurality of rows of hard disks perpendicular to the direction of the airflow are divided into a plurality of hard disk modules.

In some embodiments, along the direction of the airflow generated by the air source, a plurality of rows of hard disks perpendicular to the direction of the airflow are divided into a plurality of hard disk modules, where one row of hard disks perpendicular to the direction of the airflow is one hard disk module. Further, by allocating the read or write resources to the hard disks, the temperature of all hard disks might be ensured to be equal. The airflow velocity of the air source is adjusted according to the temperature of the hard disk module closest to the air source, thereby effectively reducing a rotation speed of a fan, and saving the energy. In some embodiments, the temperature of the hard disk module closest to the air source is lower than the temperature of the hard disk module farther from the air source through the resource allocation gradient table.

In some embodiments, the resource allocation gradient table stores a relationship between each hard disk module and an amount of the corresponding read or write resource, the hard disk module close to the air source is allocated with a high percentage of read or write resources and the hard disk module far from the air source is allocated with a small percentage of read or write resources.

In some embodiments, the resource allocation gradient table stores the relationship between each hard disk module and the amount of the corresponding read or write resource, that is, different hard disk modules are matched with different read or write resources, the hard disk module close to the air source is allocated with a high percentage of read or write resources and the hard disk module far from the air source is allocated with a small percentage of read or write resources, the percentage of the read or write resources allocated to the hard disks decreases from the end close to the air source to the end far away from the air source, whereby the loads of the hard disks are balanced, and the temperature of the hard disks is further balanced.

In some embodiments, the real-time power consumption value of the hard disks is an overall power consumption value of all hard disks, and the step of acquiring a real-time power consumption value and a power consumption reference value of the hard disks performing the read or write operations, and determining a numerical relationship between the real-time power consumption value and the power consumption reference value of the hard disks includes:

acquiring the overall power consumption value and an overall power consumption reference value of all hard disks performing the read or write operations.

In some embodiments, the real-time power consumption value of the hard disks includes two types; one is the overall power consumption value of all hard disks, and the interval polling strategy is determined according to the overall power consumption of all hard disks; and the other one is the power consumption value of each hard disk module, and the interval polling strategy is determined according to the power consumption value of each hard disk module. For the overall power consumption value mode of all hard disks, the overall power consumption value and the overall power consumption reference value of all hard disks performing the read or write operations need to be acquired to determine the numerical relationship between the overall power consumption value and the overall power consumption reference value of all hard disks.

The numeral relationship between the overall power consumption value and the overall power consumption reference value of all hard disks is determined.

In some embodiments, after the overall power consumption value and the overall power consumption reference value of all hard disks performing the read or write operations are acquired, the numerical relationship between the overall power consumption value and the overall power consumption reference value of all hard disks is determined.

In some embodiments, the step of determining a corresponding interval polling strategy according to the numerical relationship to acquire a temperature value of a target hard disk includes:

when the overall power consumption value of all hard disks is less than a threshold of the overall power consumption reference value, acquiring the temperature value of the target hard disk according to a first interval polling strategy;

when the overall power consumption value of all hard disks is equal to or greater than the threshold of the overall power consumption reference value, acquiring the temperature value of the target hard disk according to a second interval polling strategy, where a polling interval in the second interval polling strategy is smaller than the polling interval in the first interval polling strategy; and the polling interval is a quantity of hard disks between two adjacent polled hard disks.

In some embodiments, in the coordinated control method for the hard disk heat dissipation of the present application, whether the overall power consumption value of all hard disks is less than the threshold of the overall power consumption reference value is determined, and in response to the determination that the overall power consumption value of all hard disks is less than the threshold of the overall power consumption reference value, the temperature value of the target hard disk is acquired according to the first interval polling strategy.

In the coordinated control method for the hard disk heat dissipation of the present application, whether the overall power consumption value of all hard disks is less than the threshold of the overall power consumption reference value is determined, and in response to the determination that the overall power consumption value of all hard disks is equal to or greater than the threshold of the overall power consumption reference value, the temperature value of the target hard disk is acquired according to a second interval polling strategy.

In some embodiments, to increase the temperature polling efficiency of the hard disks on the premise of ensuring the accuracy in temperature acquisition of the hard disks, the interval polling strategy is employed. The interval polling strategy includes a polling interval, and the polling interval is a quantity of hard disks between two adjacent polled hard disks. After the numerical relationship between the overall power consumption value and the overall power consumption reference value of all hard disks is acquired, whether the overall power consumption value of all hard disks is less than the threshold of the overall power consumption reference value is determined, and if the overall power consumption value of all hard disks is less than the threshold of the overall power consumption reference value, it indicates that the overall power consumption value of all hard disks is within the power consumption standard, and the temperature value of the target hard disk is acquired according to the first interval polling strategy, for example, the polling interval is 2 or 3; and if the overall power consumption value of all hard disks is equal to or greater than the threshold of the overall power consumption reference value, it indicates that the overall power consumption value of all hard disks exceeds the power consumption standard, the power consumption is relatively high, and the temperature value of the target hard disk needs to be accurately measured, whereby the temperature value of the target hard disk is acquired according to the second interval polling strategy, for example, the polling interval is 0 or 1. The polling interval in the second interval polling strategy is smaller than the polling interval in the first interval polling strategy. Different interval polling strategies are selected based on the power consumption, thereby improving the temperature acquisition efficiency of the target hard disk.

In some embodiments, the real-time power consumption value of the hard disks is a module power consumption value of the hard module, and the step of acquiring a real-time power consumption value and a power consumption reference value of the hard disks performing the read or write operations, and determining a numerical relationship between the real-time power consumption value and the power consumption reference value of the hard disks includes:

acquiring the module power consumption value and a module power consumption reference value of the hard disk module performing the read or write operation.

In some embodiments, the second type of the real-time power consumption value of the hard disks is the module power consumption value of each hard disk module, and the interval polling strategy is determined according to the module power consumption value of each hard disk module. For a module power consumption value mode of each hard disk module, the module power consumption value and the module power consumption reference value of each hard disk module performing the read or write operation need to be acquired to determine a numerical relationship between the module power consumption value and the module power consumption reference value of each hard disk module.

The numeral relationship between the module power consumption value and the module power consumption reference value of the hard disk module is determined.

In some embodiments, after the module power consumption value and the module power consumption reference value of each hard disk module performing the read or write operation are acquired, the numerical relationship between the module power consumption value and the module power consumption reference value of each hard disk module is determined.

In some embodiments, the step of determining a corresponding interval polling strategy according to the numerical relationship to acquire a temperature value of a target hard disk includes:

when the module power consumption value of the hard disk module is less than a threshold of the module power consumption reference value, acquiring the temperature value of the target hard disk according to a third interval polling strategy; and when the module power consumption value of the hard disk module is equal to or greater than the threshold of the module power consumption reference value, acquiring the temperature value of the target hard disk according to a fourth interval polling strategy, where the polling interval in the fourth interval polling strategy is smaller than the polling interval in the third interval polling strategy.

In some embodiments, whether the module power consumption value of the hard disk module is less than the threshold of the module power consumption reference value is determined, in response to the determination that the module power consumption value of the hard disk module is less than the threshold of the module power consumption reference value, the temperature value of the target hard disk is acquired according to the third interval polling strategy, and in response to the determination that the module power consumption value of the hard disk module is equal to or greater than the threshold of the module power consumption reference value, the temperature value of the target hard disk is acquired according to the fourth interval polling strategy, where the polling interval in the fourth interval polling strategy is smaller than the polling interval in the third interval polling strategy.

In some embodiments, after the numerical relationship between the module power consumption value and the module power consumption reference value of the hard disk module is acquired, whether the module power consumption value of the hard disk module is less than the threshold of the module power consumption reference value is determined, and if the module power consumption value of the hard disk module is less than the threshold of the module power consumption reference value, it indicates that the module power consumption value of the hard disk module is currently within the power consumption standard, and the temperature value of the target hard disk is acquired according to the third interval polling strategy, for example, the polling interval is 2 or 3; and if the module power consumption value of the hard disk module is equal to or greater than the threshold of the module power consumption reference value, it indicates that the module power consumption value of the hard disk module exceeds the power consumption standard, the power consumption is relatively high, and the temperature value of the target hard disk needs to be accurately measured, whereby the temperature value of the target hard disk is acquired according to the fourth interval polling strategy, for example, the polling interval is 0 or 1, where the polling interval in the fourth interval polling strategy is smaller than the polling interval in the third interval polling strategy. Different interval polling strategies are selected based on the power consumption, thereby improving the temperature acquisition efficiency of the target hard disk.

In some embodiments, the numerical relationship between the real-time power consumption value and the power consumption reference value of the hard disks is a power consumption variation rate, and the step of acquiring a real-time power consumption value and a power consumption reference value of the hard disks performing the read or write operations, and determining a numerical relationship between the real-time power consumption value and the power consumption reference value of the hard disks includes:

acquiring an overall power consumption variation rate and an overall power consumption variation rate reference value of all hard disks performing the read or write operations.

In some embodiments, the power consumption variation rate is another scale that is matched with the interval polling strategy, and includes the overall power consumption variation rate of all hard disks and the power consumption variation rate of the hard disk module; for the overall power consumption variation rate mode of all hard disks, the overall power consumption variation rate and the overall power consumption variation rate reference value of all hard disks performing the read or write operations need to be acquired to determine a numerical relationship between the overall power consumption variation rate and the overall power consumption variation rate reference value of all hard disks.

A numeral relationship between the overall power consumption variation rate and the overall power consumption variation rate reference value of all hard disks is determined.

In some embodiments, after the overall power consumption variation rate and the overall power consumption variation rate reference value of all hard disks are acquired, the numerical relationship between the overall power consumption variation rate and the overall power consumption variation rate reference value of all hard disks is determined.

In some embodiments, the step of determining a corresponding interval polling strategy according to the numerical relationship to acquire a temperature value of a target hard disk includes:

when the overall power consumption variation rate of all hard disks is less than a threshold of the overall power consumption variation rate reference value, acquiring the temperature value of the target hard disk according to a fifth interval polling strategy;

when the overall power consumption variation rate of all hard disks is equal to or greater than the threshold of the overall power consumption variation rate reference value, acquiring the temperature value of the target hard disk according to a sixth interval polling strategy, where the polling interval in the sixth interval polling strategy is smaller than the polling interval in the fifth interval polling strategy.

In some embodiments, whether the overall power consumption variation rate of all hard disks is less than the threshold of the overall power consumption variation rate reference value is determined, in response to the determination that the overall power consumption variation rate of all hard disks is less than the threshold of the overall power consumption variation rate reference value, the temperature value of the target hard disk is acquired according to the fifth interval polling strategy, and in response to the determination that the overall power consumption variation rate of all hard disks is equal to or greater than the threshold of the overall power consumption variation rate reference value, the temperature value of the target hard disk is acquired according to the sixth interval polling strategy, where the polling interval in the sixth interval polling strategy is less than the polling interval in the fifth interval polling strategy.

In some embodiments, after the numerical relationship between the overall power consumption variation rate and the overall power consumption variation rate reference value of all hard disks is acquired, whether the overall power consumption variation rate of all hard disks is less than the threshold of the overall power consumption variation rate reference value is determined, and if the power consumption variation rate of all hard disks is less than the threshold of the overall power consumption variation rate reference value, it indicates that the power consumption variation rate of all hard disks is currently within the power consumption standard, and the temperature value of the target hard disk is acquired according to the fifth interval polling strategy, for example, the polling interval is 2 or 3; and if the overall power consumption variation rate of all hard disks is equal to or greater than the threshold of the overall power consumption variation rate reference value, it indicates that the power consumption variation rate of all hard disks exceeds the power consumption standard, the power consumption is relatively high, and the temperature value of the target hard disk needs to be accurately measured, whereby the temperature value of the target hard disk is acquired according to the sixth interval polling strategy, for example, the polling interval is 0 or 1. The polling interval in the sixth interval polling strategy is smaller than the polling interval in the fifth interval polling strategy. Different interval polling strategies are selected based on the power consumption, thereby improving the temperature acquisition efficiency of the target hard disk.

In some embodiments, the numerical relationship between the real-time power consumption value and the power consumption reference value of the hard disks is a power consumption variation rate, and the step of acquiring a real-time power consumption value and a power consumption reference value of the hard disks performing the read or write operations, and determining a numerical relationship between the real-time power consumption value and the power consumption reference value of the hard disks includes:

acquiring a module power consumption variation rate and a module power consumption variation rate reference value of the hard disk module performing the read or write operation.

In some embodiments, for the module power consumption variation rate mode of each hard disk module, the module power consumption variation rate and the module power consumption variation rate reference value of each hard disk module performing the read or write operation need to be acquired to determine a numerical relationship between the module power consumption variation rate and the module power consumption variation rate reference value of each hard disk module.

The numeral relationship between the module power consumption variation rate and the module power consumption variation rate reference value of the hard disk module is determined.

In some embodiments, after the module power consumption variation rate and the module power consumption variation rate reference value of each hard disk module performing the read or write operation are acquired, the numerical relationship between the module power consumption variation rate and the module power consumption variation rate reference value of each hard disk module is determined.

In some embodiments, the step of determining a corresponding interval polling strategy according to the numerical relationship to acquire a temperature value of a target hard disk includes:

when the module power consumption variation rate of the hard disk module is less than the threshold of the module power consumption variation rate reference value, acquiring the temperature value of the target hard disk according to a seventh interval polling strategy;

when the module power consumption variation rate of the hard disk module is equal to or greater than the threshold of the module power consumption variation rate reference value, acquiring the temperature value of the target hard disk according to an eighth interval polling strategy, where the polling interval in the eighth interval polling strategy is smaller than the polling interval in the seventh interval polling strategy.

In some embodiments, whether the module power consumption variation rate of the hard disk module is less than threshold of the module power consumption variation rate reference value is determined, in response to the determination that the module power consumption variation rate of the hard disk module is less than the threshold of the module power consumption variation rate reference value, the temperature value of the target hard disk is acquired according to the seventh interval polling strategy, and in response to the determination that the module power consumption variation rate of the hard disk module is equal to or greater than the threshold of the module power consumption variation rate reference value, the temperature value of the target hard disk is acquired according to the eighth interval polling strategy, where the polling interval in the eighth interval polling strategy is smaller than the polling interval in the seventh interval polling strategy.

In some embodiments, after the numerical relationship between the module power consumption variation rate and the module power consumption variation rate reference value of the hard disk module is acquired, whether the module power consumption variation rate of the hard disk module is less than the threshold of the module power consumption variation rate reference value is determined, and if the module power consumption variation rate of the hard disk module is less than the threshold of the module power consumption variation rate reference value, it indicates that the module power consumption variation rate of the hard disk module is within the power consumption standard, and the temperature value of the target hard disk is acquired according to the seventh interval polling strategy, for example, the polling interval is 2 or 3; and if the module power consumption variation rate of the hard disk module is equal to or greater than the threshold of the module power consumption variation rate reference value, it indicates that the power consumption variation rate of the hard disk module exceeds the power consumption standard, the power consumption increases rapidly, and the temperature value of the target hard disk needs to be accurately measured, whereby the temperature value of the target hard disk is acquired according to the eighth interval polling strategy, for example, the polling interval is 0 or 1. The polling interval in the eighth interval polling strategy is smaller than the polling interval in the seventh interval polling strategy. Different interval polling strategies are selected based on the power consumption, thereby improving the temperature acquisition efficiency of the target hard disk.

In some embodiments, when the overall power consumption variation rate of all hard disks is less than the threshold of the overall power consumption variation rate reference value, and/or, when the module power consumption variation rate of the hard disk module is less than the threshold of the module power consumption variation rate reference value, the polling intervals in both the fifth interval polling strategy and the seventh interval polling strategy are 2.

In some embodiments, when the overall power consumption variation rate of all hard disks is less than the threshold of the overall power consumption variation rate reference value, and/or, when the module power consumption variation rate of the hard disk module is less than the threshold of the module power consumption variation rate reference value, the polling intervals in both the fifth interval polling strategy and the seventh interval polling strategy are 2. Similarly, if the overall power consumption value of all hard disks is less than the threshold of the overall power consumption reference value, and/or the module power consumption value of the hard disk module is less than the threshold of the module power consumption reference value, the polling interval is 2.

In some embodiments, when the overall power consumption variation rate of all hard disks is equal to or greater than the threshold of the overall power consumption variation rate reference value, and the module power consumption variation rate of the hard disk module is equal to or greater than the threshold of the module power consumption variation rate reference value, the polling intervals in both the sixth interval polling strategy and the eighth interval polling strategy are 1.

In some embodiments, the step of performing coordinated control on the hard disk heat dissipation according to the temperature value of the target hard disk includes:

determining an average temperature value of the hard disk module including the target hard disk according to the temperature value of the target hard disk.

In some embodiments, after the temperature value of the target hard disk is acquired by means of the corresponding interval polling strategy, the temperature values of the target hard disks included in the same hard disk module are calculated to obtain an average temperature value of the hard disk module, and the average temperature value of each hard disk module is calculated in sequence.

When a difference between the average temperature values of different hard disk modules is greater than a preset reference value, the resource allocation gradient table is dynamically adjusted according to the difference between the average temperature values of different hard disk modules.

In some embodiments, if the difference between the average temperature values of different hard disk modules is greater than the preset reference value, it indicates that the temperature difference between different hard disk modules is great, the temperature distribution is non-uniform, accordingly, the resource allocation gradient table is inappropriate then, and the resource allocation gradient table needs to be adjusted dynamically according to the real-time average temperature value of the hard disk module, thereby increasing the read or write resource allocated to the hard disk module with a small average temperature value, and reducing the read or write resource allocated to the hard disk module with a large average temperature value.

In some embodiments, the overall power consumption value and the module power consumption value are average values.

In some embodiments, the polling interval strategy may be selected according to the overall power consumption value of all hard disks, or may be selected according to an average power consumption value of all hard disks, whereby the control mode with the average value is more accurate; and an average module power consumption value may also be employed.

In some embodiments, the step of performing coordinated control on the hard disk heat dissipation according to the temperature value of the target hard disk further includes:

when any target hard disk is in an abnormal temperature state, reporting the target hard disk in the abnormal temperature state, and triggering an alarm.

In some embodiments, among the acquired temperature values of the target hard disks, if the temperature of any target hard disk is in an abnormal state, that is, the temperature is relatively high, the hard disk may have a fault, whereby the target hard disk that is in the abnormal temperature state needs to be reported and alarmed to notify the maintenance personnel for maintenance.

In some embodiments, the step of performing coordinated control on the hard disk heat dissipation according to the temperature value of the target hard disk further includes:

when an average temperature value of the target hard disk is greater than a reference average value, increasing an airflow velocity of the air source In some embodiments, after the temperature values of the target hard disks are acquired, the average temperature value of all hard disks is calculated; and if the average temperature value of all hard disks is greater than the reference average value, it indicates that the temperature of all hard disks is relatively high, whereby the heat dissipation capability needs to be improved, and the flow velocity of the heat dissipation airflow generated by the air source needs to be increased to meet the heat dissipation requirement of all hard disks.

In some embodiments, referring to FIG. 2, FIG. 2 is a second flowchart of a coordinated control method for hard disk heat dissipation provided by an embodiment of the present application. In the method shown in FIG. 2, for the content that is the same as or similar to that in the method shown in FIG. 1, refer to the descriptions in the method shown in FIG. 1. Details are not described herein again.

S201: dividing hard disks into modules along a direction of an airflow generated by an air source.

The temperature of the hard disks that are close to the air source is relatively low, and the temperature of the hard disks that are far away from the air source is relatively high, and accordingly, the temperature of the hard disks changes along the direction of the airflow generated by the air source; and therefore, the hard disks are divided into the modules along the direction of the airflow generated by the air source.

S202: dividing a plurality of rows of hard disks perpendicular to the direction of the airflow into a plurality of hard disk modules, where one row of hard disks perpendicular to the direction of the airflow is one hard disk module.

Along the direction of the airflow generated by the air source, a plurality of rows of hard disks perpendicular to the direction of the airflow are divided into a plurality of hard disk modules, where one row of hard disks perpendicular to the direction of the airflow is one hard disk module.

S203: acquiring a resource allocation gradient table, and allocating read or write resources to the plurality of hard disk modules according to the resource allocation gradient table.

In the prior art, the temperature of the hard disks that are close to the air source is relatively low, and the temperature of the hard disks that are far away from the air source is relatively high, the percentage of a temperature increase from an end close to the air source to an end far away from the air source may be acquired based on the data, and an allocation ratio of the read or write resources may be determined by means of the percentage of temperature increase. The temperature of the hard disks increases from the end close to the air source to the end far away from the air source, whereby the percentage of the read or write resources allocated to the hard disks from the end close to the air source to the end far away from the air source decreases, whereby loads of the hard disks are balanced, and the temperature of the hard disks is further balanced.

S204: performing read or write operations on the hard disks according to respective allocated read or write resources.

The hard disks are grouped according to a distance from the hard disks to an air source, and the read or write resources are allocated to the grouped hard disks, to enable each hard disk to perform read or write operations according to respective allocated read or write resources, thereby achieving an effect of balancing the temperature.

S205: acquiring a module power consumption variation rate and a module power consumption variation rate reference value of the hard disk module performing the read or write operation.

For the module power consumption variation rate mode of the hard disk module, the module power consumption variation rate and the module power consumption variation rate reference value of the hard disk module performing the read or write operation need to be acquired to determine a numerical relationship between the module power consumption variation rate and the module power consumption variation rate reference value of the hard disk module.

S206: determining a numeral relationship between the module power consumption variation rate and the module power consumption variation rate reference value of the hard disk module.

After the module power consumption variation rate and the module power consumption variation rate reference value of the hard disk module are acquired, the numerical relationship between the module power consumption variation rate and the module power consumption variation rate reference value of the hard disk module is determined.

S207: when the module power consumption variation rate of the hard disk module is less than a threshold of the module power consumption variation rate reference value, performing step S208 to acquire a temperature value of a target hard disk according to a seventh interval polling strategy.

When the module power consumption variation rate of the hard disk module is equal to or greater than the threshold of the module power consumption variation rate reference value, performing step S209 to acquire the temperature value of the target hard disk according to an eighth interval polling strategy.

S208: acquiring the temperature value of the target hard disk according to the seventh interval polling strategy, where the polling interval is 2.

S209: acquiring the temperature value of the target hard disk according to the eighth interval polling strategy, where the polling interval is 1.

After the numerical relationship between the module power consumption variation rate and the module power consumption variation rate reference value of the hard disk module is acquired, whether the module power consumption variation rate of the hard disk module is less than the threshold of the module power consumption variation rate reference value is determined, and if the module power consumption variation rate of the hard disk module is less than the threshold of the module power consumption variation rate reference value, it indicates that the power consumption variation rate of the hard disk module is currently within the power consumption standard, and the temperature value of the target hard disk is acquired according to the seventh interval polling strategy, for example, the polling interval is 2 or 3; and if the module power consumption variation rate of the hard disk module is equal to or greater than the threshold of the module power consumption variation rate reference value, it indicates that the power consumption variation rate of the hard disk module exceeds the power consumption standard, the power consumption is relatively high, and the temperature value of the target hard disk needs to be accurately measured, whereby the temperature value of the target hard disk is acquired according to the eighth interval polling strategy, for example, the polling interval is 0 or 1. The polling interval in the eighth interval polling strategy is smaller than the polling interval in the seventh interval polling strategy. Different interval polling strategies are selected based on the power consumption, thereby improving the temperature acquisition efficiency of the target hard disk.

S210: determining an average temperature value of the hard disk module including the target hard disk according to the temperature value of the target hard disk.

After the temperature value of the target hard disk is acquired by means of the corresponding interval polling strategy, the temperature values of the target hard disks included in the same hard disk module are calculated to obtain an average temperature value of the hard disk module, and the average temperature value of each hard disk module is calculated in sequence.

S211: when a difference between the average temperature values of different hard disk modules is greater than a preset reference value, performing step S212 to dynamically adjust the resource allocation gradient table according to the difference between the average temperature values of different hard disk modules.

If the difference between the average temperature values of different hard disk modules is greater than the preset reference value, it indicates that the temperature difference between different hard disk modules is great, the temperature distribution is non-uniform, accordingly, the resource allocation gradient table is inappropriate then, and the resource allocation gradient table needs to be adjusted dynamically according to the real-time average temperature value of the hard disk module, thereby increasing the read or write resource allocated to the hard disk module with a small average temperature value, and reducing the read or write resource allocated to the hard disk module with a large average temperature value.

When the difference between the average temperature values of different hard disk modules is equal to or less than the preset reference value, performing step S213 or step S214.

S213: when any target hard disk is in an abnormal temperature state, reporting the abnormal temperature state of the target hard disk, and triggering an alarm.

Among the acquired temperature values of the target hard disks, if the temperature of any target hard disk is in an abnormal state, that is, the temperature is relatively high, the hard disk may have a fault, whereby the target hard disk that is in the abnormal temperature state needs to be reported and alarmed to notify the maintenance personnel for maintenance.

S214: when an average temperature value of the target hard disk is greater than a reference average value, increasing an airflow velocity of the air source.

After the temperature values of the target hard disks are acquired, the average temperature value of all hard disks may be calculated; and if the average temperature value of all hard disks is greater than the reference average value, it indicates that the temperature of all hard disks is relatively high, whereby the heat dissipation capability needs to be improved, and the flow velocity of the heat dissipation airflow generated by the air source needs to be increased to meet the heat dissipation requirement of all hard disks.

It should be understood that although each step in the flowcharts of FIG. 1 to FIG. 2 is shown by the sequence as indicated by the arrow, these steps are not necessarily executed in the sequence as indicated by the arrow. Unless explicitly stated in the description, the execution of these operations is not strictly limited in sequence, and these operations may be executed in other sequences. Moreover, at least some steps in FIG. 1 to FIG. 2 may include a plurality of sub-steps or phases, which are not necessarily executed at the same time, but may be executed at different moments, and the execution sequence of these sub-steps or phases is not necessarily sequential, but may be alternately executed with other steps or at least some sub-steps or phases of other steps.

Figure 3:
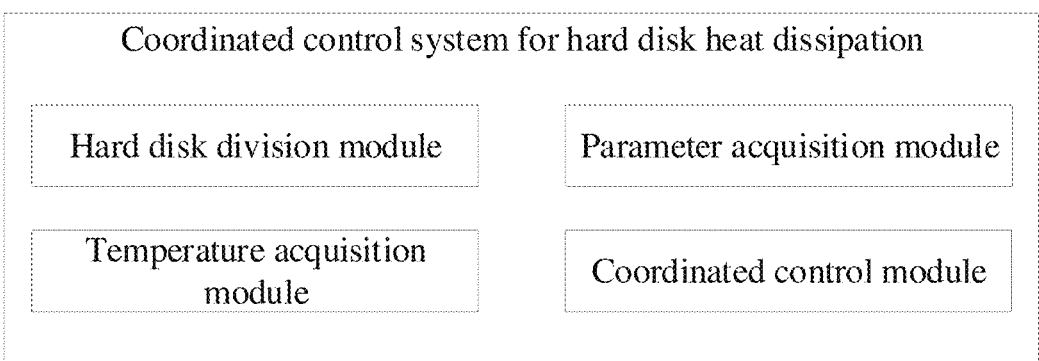
FIG. 3 is a structural diagram of a coordinated control system for hard disk heat dissipation according to one or more embodiments of the present application.

In some embodiments, referring to FIG. 3, FIG. 3 is a structural diagram of a coordinated control system for hard disk heat dissipation provided by an embodiment of the present application.

The coordinated control method for the hard disk heat dissipation includes:

a hard disk division module, configured to group hard disks according to a distance from the hard disks to an air source, and allocate read or write resources to the grouped hard disks, to enable the hard disks to perform read or write operations according to respective allocated read or write resources, where for controlling the read or write resource allocation for different hard disks, the hard disks are firstly grouped by the hard disk division module according to the distance from the hard disks to the air source, and then the read or write resources are allocated to the grouped hard disks, to enable the hard disks to perform the read or write operations according to respective allocated read or write resources, thereby achieving an effect of balancing the temperature;

a parameter acquisition module, configured to acquire a real-time power consumption value and a power consumption reference value of the hard disks performing the read or write operations, and determine a numerical relationship between the real-time power consumption value and the power consumption reference value of the hard disks, where after the read or write resources are allocated, each hard disk performs the read or write operation according to the respective allocated read or write resource, then the real-time power consumption value and the power consumption reference value of the hard disks performing the read or write operations are acquired, and the numerical relationship between the real-time power consumption value and the power consumption reference value of the hard disks is determined, whereby different interval polling strategies are selected according to the numerical relationship between the real-time power consumption value and the power consumption reference value of the hard disks;

a temperature acquisition module, configured to determine a corresponding interval polling strategy according to the numerical relationship to acquire a temperature value of a target hard disk, where after the numerical relationship between the real-time power consumption value and the power consumption reference value of the hard disk is determined, different interval polling strategies may be determined according to the numerical relationship between the two; and the temperature value of the target hard disk is acquired by employing the interval polling method for the hard disks without polling all hard disks, whereby the overall temperature of the hard disks might be reflected, and the efficiency for acquiring the temperature state of the hard disks might be improved effectively; and a coordinated control module, configured to perform coordinated control on hard disk heat dissipation according to the temperature value of the target hard disk.

After the temperature value of the target hard disk is acquired, the corresponding heat dissipation control may be performed according to the acquired temperature value of the target hard disk. For example, if the temperature state of the target hard disk is abnormal, the information of the target hard disk may be reported and alarmed to prompt the maintenance personnel for maintenance; or whether the heat dissipation requirement of the hard disk is met is determined according to the temperature value of the target hard disk, and if the heat dissipation requirement of the hard disk fails to be met, the flow velocity of the heat dissipation airflow generated by the air source may be adjusted to improve the heat dissipation capability, thereby meeting the heat dissipation requirement of the hard disk.

Regarding the specific limitation to the coordinated control system for the hard disk heat dissipation, refer to the limitation to the method described above, which is not repeated herein. Each module in the foregoing coordinated control system for the hard disk heat dissipation may be implemented entirely or partially through software, hardware, or a combination thereof. The foregoing modules may be embedded to or may be independent from a processor in a computer device in a hardware form, or may be stored in a memory in the computer device in a software form, to facilitate the processor to perform the operations corresponding to each module.

In some embodiments, the present embodiment provides a computer device, which includes a memory and one or more processors, where the memory has computer-readable instructions stored therein, and the computer-readable instructions, when executed by the one or more processors, cause the one or more processors to perform the steps of any one method in the aforementioned embodiments.

Figure 4:
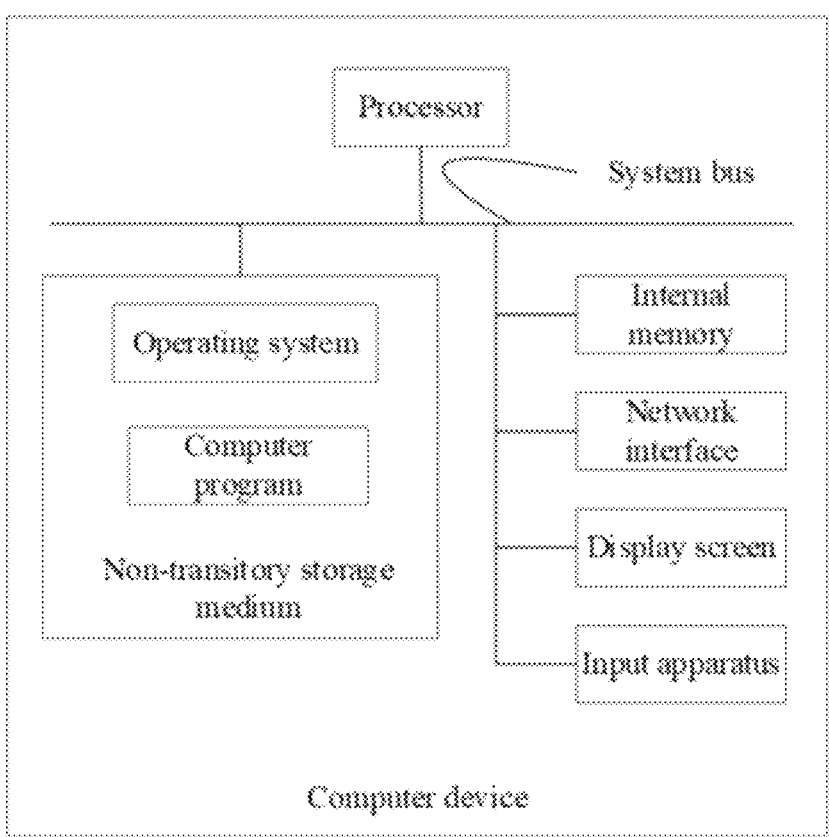
FIG. 4 is a structural diagram of a computer device according to one or more embodiments of the present application.

The computer device may be a terminal, and an internal structure diagram thereof may be as shown in FIG. 4. The computer device includes a processor, a memory, a network interface, a display screen, and an input apparatus which are connected by means of a system bus. The processor of the computer device is configured to provide computing and control capabilities. The memory of the computer device includes a non-transitory storage medium and an internal memory. The non-transitory storage medium stores an operating system and computer programs. The internal memory provides an operating environment for running the operating system and the computer programs in the non-transitory storage medium. The network interface of the computer device is configured to communicate with an external terminal by means of network connection. The computer programs, when executed by the processor, implement the coordinated control method of hard disk heat dissipation. The display screen of the computer device may be a liquid crystal display screen or an e-ink display screen. The input apparatus of the computer device may be a touch layer covering the display screen, or may be a key, a trackball, or a touch-pad disposed on a housing of the computer device, or may be an external keyboard, touch-pad, a mouse or the like.

A person skilled in the art may understand that, structures shown in FIG. 4 are merely block diagrams of a partial structure related to a solution in the present application, and do not constitute a limitation to the computer device to which the solution in the application is applied. In some embodiments, the computer device may include more components or fewer components than those shown in the figure, or some components may be combined, or a different component deployment may be used.

In some embodiments, provided is a computer device, which includes a memory and one or more processors, where the memory has computer-readable instructions stored therein, and the computer-readable instructions, when executed by the one or more processors, cause the one or more processors to perform the following steps:

grouping hard disks according to a distance from the hard disks to an air source, and allocating read or write resources to the grouped hard disks, to enable the hard disks to perform read or write operations according to respective allocated read or write resources;

acquiring a real-time power consumption value and a power consumption reference value of the hard disks performing the read or write operations, and determining a numerical relationship between the real-time power consumption value and the power consumption reference value of the hard disks;

determining a corresponding interval polling strategy according to the numerical relationship to acquire a temperature value of a target hard disk; and performing coordinated control on the hard disk heat dissipation according to the temperature value of the target hard disk.

In some embodiments the present embodiment provides one or more non-transitory computer-readable storage media having computer-readable instructions stored therein, where the computer-readable instructions, when executed by one or more processors, cause the one or more processors to perform the following steps:

grouping hard disks according to a distance from the hard disks to an air source, and allocating read or write resources to the grouped hard disks, to enable the hard disks to perform read or write operations according to respective allocated read or write resources;

acquiring a real-time power consumption value and a power consumption reference value of the hard disks performing the read or write operations, and determining a numerical relationship between the real-time power consumption value and the power consumption reference value of the hard disks;

determining a corresponding interval polling strategy according to the numerical relationship to acquire a temperature value of a target hard disk; and performing coordinated control on the hard disk heat dissipation according to the temperature value of the target hard disk.

Those ordinary skilled in the art may understand that implementing all or part of the process in the method of the above-mentioned embodiments may be completed by instructing related hardware through the computer programs. The above-mentioned programs may be stored in the non-transitory computer-readable storage medium, and when executed, the computer programs may include the process of the embodiments of the above-mentioned method. Any reference to memories, storage, database or other media used in the embodiments provided in the present application may include non-transitory and/or volatile memory. The non-transitory memory may include a read only memory (ROM), a programmable ROM (PROM), an electronic programmable ROM (EPROM), and an electronic erasable programmable ROM (EEPROM) or flash memory. The volatile memory may include a random access memory (RAM) and/or external cache memory. As for illustration rather than limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), memory bus (Rambus) direct RAM (RDRAM) and direct memory bus dynamic RAM (DRDRAM), and memory bus dynamic RAM (RDRAM), etc.

In some embodiments, the present embodiment provides a storage server, which includes a coordinated control system for hard disk heat dissipation to perform the following steps:

grouping hard disks according to a distance from the hard disks to an air source, and allocating read or write resources to the grouped hard disks, to enable the hard disks to perform read or write operations according to respective allocated read or write resources;

acquiring a real-time power consumption value and a power consumption reference value of the hard disks performing the read or write operations, and determining a numerical relationship between the real-time power consumption value and the power consumption reference value of the hard disks;

determining a corresponding interval polling strategy according to the numerical relationship to acquire a temperature value of a target hard disk; and performing coordinated control on the hard disk heat dissipation according to the temperature value of the target hard disk.

Figure 5:
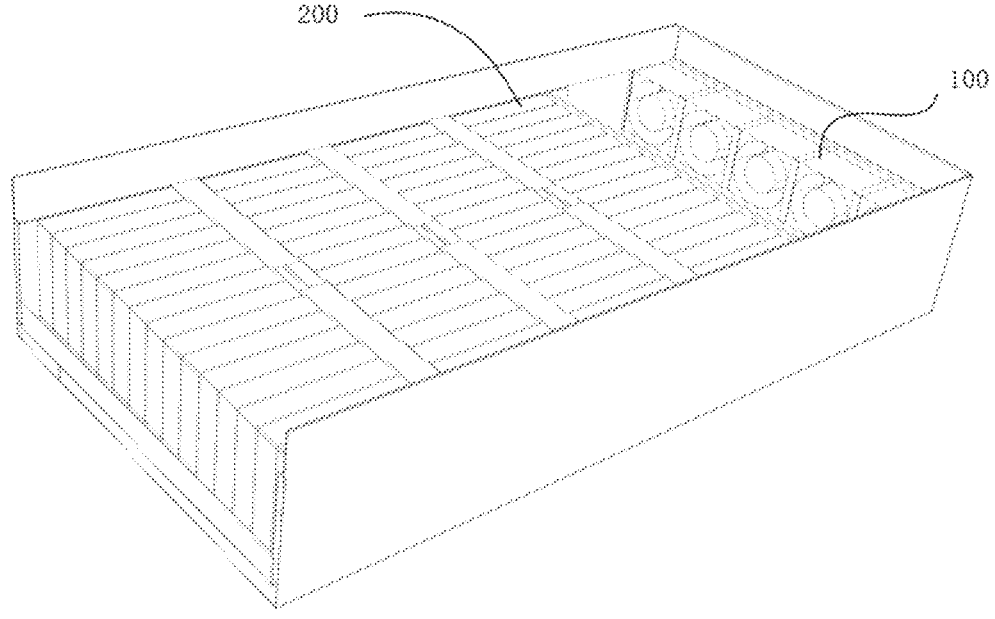
FIG. 5 is a structural diagram of a storage server according to one or more embodiments of the present application.

In some embodiments, referring to FIG. 5, FIG. 5 is a structural diagram of a storage server according to one or more embodiments of the present application. The storage server includes multiple hard disks 200 and multiple air source 100.

Technical features of the foregoing embodiments may be combined in different manners. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the present application, which are described in some embodiments and in detail, but cannot be construed as a limitation to the patent scope of the present application. It is to be noted that for a person of ordinary skill in the art, several transformations and improvements might be made without departing from the idea of the present application. These transformations and improvements belong to the protection scope of the present application. Therefore, the protection scope of the patent of the present application shall be subject to the appended claims.

REFERENCE SIGNS

200 hard disks.
100 air source

What is claimed is:

1. A coordinated control method for hard disk heat dissipation, comprising:

grouping hard disks according to a distance from the hard disks to an air source, and allocating read and write resources to the grouped hard disks, to enable the hard disks to perform read and write operations according to respective allocated read and write resources;

acquiring a real-time power consumption value and a power consumption reference value of the hard disks performing the read and write operations, and determining a numerical relationship between the real-time power consumption value and the power consumption reference value of the hard disks;

determining a corresponding interval polling strategy according to the numerical relationship to acquire a temperature value of a target hard disk; and performing coordinated control on the hard disk heat dissipation according to the temperature value of the target hard disk.

2. The coordinated control method for the hard disk heat dissipation according to claim 1, wherein the grouping hard disks according to the distance from the hard disks to the air source, and allocating the read and write resources to the grouped hard disks comprises:

dividing the hard disks into a plurality of hard disk modules according to the distance from the hard disks to the air source; and acquiring a resource allocation gradient table, and allocating the read and write resources to the plurality of hard disk modules according to the resource allocation gradient table.

3. The coordinated control method for the hard disk heat dissipation according to claim 2, wherein the dividing the hard disks into the plurality of hard disk modules according to the distance from the hard disks to the air source comprises:

dividing the hard disks into modules along a direction of an airflow generated by the air source; and dividing a plurality of rows of hard disks perpendicular to the direction of the airflow into the plurality of hard disk modules, wherein one row of the plurality of rows of hard disks perpendicular to the direction of the airflow is one hard disk module.

4. The coordinated control method for the hard disk heat dissipation according to claim 3, wherein the resource allocation gradient table stores a relationship between each of the plurality of hard disk modules and an amount of a corresponding read and write resource of the read and write resources, a hard disk module of the plurality of hard disk modules close to the air source is allocated with a high percentage of the read and write resources and a hard disk module of the plurality of hard disk modules far from the air source is allocated with a small percentage of the read and write resources.

5. The coordinated control method for the hard disk heat dissipation according to claim 2, wherein the real-time power consumption value of the hard disks is an overall power consumption value of all hard disks, and the acquiring the real-time power consumption value and the power consumption reference value of the hard disks performing the read and write operations, and determining the numerical relationship between the real-time power consumption value and the power consumption reference value of the hard disks comprises:

acquiring the overall power consumption value and an overall power consumption reference value of all hard disks performing the read and write operations; and determining a numeral relationship between the overall power consumption value and the overall power consumption reference value of all hard disks.

6. The coordinated control method for the hard disk heat dissipation according to claim 5, wherein the determining the corresponding interval polling strategy according to the numerical relationship to acquire the temperature value of the target hard disk comprises:

when the overall power consumption value of all hard disks is less than a threshold of the overall power consumption reference value, acquiring the temperature value of the target hard disk according to a first interval polling strategy;

when the overall power consumption value of all hard disks is equal to or greater than the threshold of the overall power consumption reference value, acquiring the temperature value of the target hard disk according to a second interval polling strategy, wherein a polling interval in the second interval polling strategy is smaller than the polling interval in the first interval polling strategy; and the polling interval is a quantity of hard disks between two adjacent polled hard disks.

7. The coordinated control method for the hard disk heat dissipation according to claim 6, wherein the real-time power consumption value of the hard disks is a module power consumption value of the hard disk module, and the acquiring the real-time power consumption value and the power consumption reference value of the hard disks performing the read and write operations, and determining the numerical relationship between the real-time power consumption value and the power consumption reference value of the hard disks comprises:

acquiring the module power consumption value and a module power consumption reference value of a hard disk module of the plurality of hard disk modules performing a read and write operation of the read and write operations; and determining a numeral relationship between the module power consumption value and the module power consumption reference value of the hard disk module performing the read and write operation.

8. The coordinated control method for the hard disk heat dissipation according to claim 7, wherein the determining the corresponding interval polling strategy according to the numerical relationship to acquire the temperature value of the target hard disk comprises:

when the module power consumption value of the hard disk module performing the read and write operation is less than a threshold of the module power consumption reference value, acquiring the temperature value of the target hard disk according to a third interval polling strategy; and when the module power consumption value of the hard disk module performing the read and write operation is equal to or greater than the threshold of the module power consumption reference value, acquiring the temperature value of the target hard disk according to a fourth interval polling strategy, wherein the polling interval in the fourth interval polling strategy is smaller than the polling interval in the third interval polling strategy.

9. The coordinated control method for the hard disk heat dissipation according to claim 8, wherein the numerical relationship between the real-time power consumption value and the power consumption reference value of the hard disks is a power consumption variation rate, and the acquiring the real-time power consumption value and the power consumption reference value of the hard disks performing the read and write operations, and determining the numerical relationship between the real-time power consumption value and the power consumption reference value of the hard disks comprises:

acquiring an overall power consumption variation rate and an overall power consumption variation rate reference value of all hard disks performing the read and write operations; and determining a numeral relationship between the overall power consumption variation rate and the overall power consumption variation rate reference value of all hard disks.

10. The coordinated control method for the hard disk heat dissipation according to claim 9, wherein the determining the corresponding interval polling strategy according to the numerical relationship to acquire the temperature value of the target hard disk comprises:

when the overall power consumption variation rate of all hard disks is less than a threshold of the overall power consumption variation rate reference value, acquiring the temperature value of the target hard disk according to a fifth interval polling strategy; and when the overall power consumption variation rate of all hard disks is equal to or greater than the threshold of the overall power consumption variation rate reference value, acquiring the temperature value of the target hard disk according to a sixth interval polling strategy, wherein the polling interval in the sixth interval polling strategy is smaller than the polling interval in the fifth interval polling strategy.

11. The coordinated control method for the hard disk heat dissipation according to claim 10, wherein the acquiring the real-time power consumption value and the power consumption reference value of the hard disks performing the read and write operations, and determining the numerical relationship between the real-time power consumption value and the power consumption reference value of the hard disks comprises:

acquiring a module power consumption variation rate and a module power consumption variation rate reference value of the hard disk module performing the read and write operation; and determining a numeral relationship between the module power consumption variation rate and the module power consumption variation rate reference value of the hard disk module performing the read and write operation.

12. The coordinated control method for the hard disk heat dissipation according to claim 11, wherein the determining the corresponding interval polling strategy according to the numerical relationship to acquire the temperature value of the target hard disk comprises:

when the module power consumption variation rate of the hard disk module performing the read and write operation is less than a threshold of the module power consumption variation rate reference value, acquiring the temperature value of the target hard disk according to a seventh interval polling strategy; and when the module power consumption variation rate of the hard disk module performing the read and write operation is equal to or greater than the threshold of the module power consumption variation rate reference value, acquiring the temperature value of the target hard disk according to an eighth interval polling strategy, wherein the polling interval in the eighth interval polling strategy is smaller than the polling interval in the seventh interval polling strategy.

13. The coordinated control method for the hard disk heat dissipation according to claim 12, wherein when the overall power consumption variation rate of all hard disks is less than the threshold of the overall power consumption variation rate reference value, and/or, when the module power consumption variation rate of the hard disk module is less than the threshold of the module power consumption variation rate reference value, the polling intervals in both the fifth interval polling strategy and the seventh interval polling strategy are 2.

14. The coordinated control method for the hard disk heat dissipation according to claim 13, wherein when the overall power consumption variation rate of all hard disks is equal to or greater than the threshold of the overall power consumption variation rate reference value, and the module power consumption variation rate of the hard disk module is equal to or greater than the threshold of the module power consumption variation rate reference value, the polling intervals in both the sixth interval polling strategy and the eighth interval polling strategy are 1.

15. The coordinated control method for the hard disk heat dissipation according to claim 2, wherein the performing coordinated control on the hard disk heat dissipation according to the temperature value of the target hard disk comprises:

determining an average temperature value of a hard disk module of the plurality of hard disk modules comprising the target hard disk according to the temperature value of the target hard disk; and when a difference between average temperature values of different hard disk modules of the plurality of hard disk modules is greater than a preset reference value, dynamically adjusting the resource allocation gradient table according to the difference between the average temperature values of different hard disk modules.

16. The coordinated control method for the hard disk heat dissipation according to claim 8, wherein the overall power consumption value and the module power consumption value are average values.

17. The coordinated control method for the hard disk heat dissipation according to claim 1, wherein the performing coordinated control on the hard disk heat dissipation according to the temperature value of the target hard disk comprises:

when the target hard disk is in an abnormal temperature state, reporting the abnormal temperature state of the target hard disk, and triggering an alarm.

18. The coordinated control method for the hard disk heat dissipation according to claim 1, wherein the performing coordinated control on the hard disk heat dissipation according to the temperature value of the target hard disk comprises:

when an average temperature value of the target hard disk is greater than a reference average value, increasing an airflow velocity of the air source.

19. A computer device, comprising a memory, a processor, and computer programs stored in the memory and capable of running on the processor, wherein the processor, when executing the computer programs, is configured to perform operations for a coordinated control method for hard disk heat dissipation, the operations comprising:

grouping hard disks according to a distance from the hard disks to an air source, and allocating read and write resources to the grouped hard disks, to enable the hard disks to perform read and write operations according to respective allocated read and write resources;

acquiring a real-time power consumption value and a power consumption reference value of the hard disks performing the read and write operations, and determining a numerical relationship between the real-time power consumption value and the power consumption reference value of the hard disks;

determining a corresponding interval polling strategy according to the numerical relationship to acquire a temperature value of a target hard disk; and performing coordinated control on the hard disk heat dissipation according to the temperature value of the target hard disk.

20. A non-transitory computer-readable storage medium, having computer programs stored therein, wherein the computer programs, when executed by a processor, are configured to cause the processor to perform operations of a coordinated control method for hard disk heat dissipation, the operations comprising:

grouping hard disks according to a distance from the hard disks to an air source, and allocating read and write resources to the grouped hard disks, to enable the hard disks to perform read and write operations according to respective allocated read and write resources;

acquiring a real-time power consumption value and a power consumption reference value of the hard disks performing the read and write operations, and determining a numerical relationship between the real-time power consumption value and the power consumption reference value of the hard disks;

determining a corresponding interval polling strategy according to the numerical relationship to acquire a temperature value of a target hard disk; and performing coordinated control on the hard disk heat dissipation according to the temperature value of the target hard disk.

\* \* \* \* \*